(12) United States Patent
Griffith et al.

(10) Patent No.: US 7,814,484 B2
(45) Date of Patent: Oct. 12, 2010

(54) SYSTEM AND METHOD FOR WEB APPLICATION EXTENSIBILITY

(75) Inventors: Mark Griffith, Issaquah, WA (US); Vinod Mehra, Alameda, CA (US); Rob Woollen, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 1256 days.

(21) Appl. No.: 11/128,908

(22) Filed: May 13, 2005

(65) Prior Publication Data

US 2005/0278718 A1   Dec. 15, 2005

Related U.S. Application Data

(60) Provisional application No. 60/571,106, filed on May 14, 2004.

(51) Int. Cl.
G06F 9/44 (2006.01)
G06F 9/445 (2006.01)
G06F 15/177 (2006.01)

(52) U.S. Cl. .................. 717/178; 717/163; 717/169; 717/173; 717/175; 709/220; 709/223

(58) Field of Classification Search ......... 717/162–178; 709/220, 223
See application file for complete search history.

(56) References Cited

U.S. PATENT DOCUMENTS

| | | | |
|---|---|---|---|
| 5,835,777 A | 11/1998 | Staelin | 395/712 |
| 5,911,071 A | 6/1999 | Jordan | |
| 6,106,570 A | 8/2000 | Mizuhara | |
| 6,128,647 A | 10/2000 | Haury | |
| 6,529,992 B1 | 3/2003 | Thomas | |
| 6,564,234 B2 | 5/2003 | Bamford et al. | |
| 6,721,777 B1 | 4/2004 | Sharma | 709/101 |
| 6,751,797 B1 | 6/2004 | Desgranges | |
| 6,766,324 B2 | 7/2004 | Carlson | |
| 6,829,575 B2 | 12/2004 | Freund | |
| 6,892,382 B1 * | 5/2005 | Hapner et al. | 717/174 |
| 6,970,924 B1 | 11/2005 | Chu | |
| 6,976,061 B1 * | 12/2005 | Sharma | 709/220 |
| 7,069,553 B2 | 6/2006 | Narayanaswamy et al. | |
| 7,086,065 B1 | 8/2006 | Yeluripati | |
| 7,107,592 B2 | 9/2006 | Taylor | |
| 7,127,713 B2 * | 10/2006 | Davis et al. | 717/177 |
| 7,185,071 B2 * | 2/2007 | Berg et al. | 717/176 |
| 7,228,541 B2 | 6/2007 | Gupton | |
| 7,246,104 B2 | 7/2007 | Stickler | |

(Continued)

OTHER PUBLICATIONS

Chappell, Dave, et al., "Java Message Service," O'Reilly, Dec. 2000.

(Continued)

*Primary Examiner*—Wei Y Zhen
*Assistant Examiner*—Ryan D Coyer
(74) *Attorney, Agent, or Firm*—Fliesler Meyer LLP

(57) ABSTRACT

Resources provided by web applications can be extended through the implementation of library modules and extensions. Library modules stored outside a web application can provide resources in a web application environment as if they were part of the web application itself. Additionally, web applications can be configured with application extensions that are web applications stored as archives within containing web applications.

27 Claims, 5 Drawing Sheets

U.S. PATENT DOCUMENTS

| | | |
|---|---|---|
| 7,302,609 B2 | 11/2007 | Matena |
| 7,509,252 B2 | 3/2009 | Cencini et al. |
| 2002/0049744 A1 | 4/2002 | Nakos |
| 2002/0078132 A1 | 6/2002 | Cullen |
| 2002/0178439 A1 | 11/2002 | Rich et al. |
| 2003/0005093 A1 | 1/2003 | Deboer |
| 2003/0093717 A1 | 5/2003 | Mason |
| 2003/0101435 A1 | 5/2003 | Takahashi et al. |
| 2003/0158919 A1* | 8/2003 | Fomenko .................... 709/220 |
| 2003/0204784 A1 | 10/2003 | Jorapur |
| 2003/0212990 A1* | 11/2003 | Brodkorb et al. ............ 717/174 |
| 2004/0068537 A1 | 4/2004 | Freund |
| 2004/0068553 A1 | 4/2004 | Davis |
| 2004/0068731 A1 | 4/2004 | Davis et al. |
| 2004/0088681 A1 | 5/2004 | Berg |
| 2004/0172407 A1* | 9/2004 | Arpirez Vega .......... 707/103 R |
| 2004/0255294 A1 | 12/2004 | Spotwood |
| 2005/0005200 A1 | 1/2005 | Matena |
| 2005/0033767 A1 | 2/2005 | Kamentz |
| 2005/0138076 A1 | 6/2005 | Seo |

OTHER PUBLICATIONS

Taylor, Art, "J2EE and Beyond: Design, Develop, and Deploy World-Class Java™ Software," Prentice-Hall, Dec. 23, 2002.

Guo, Yike, et al., "Developing a Distributed Scalable Java Component Server," Future Generation Computer Systems, May 24, 2001, vol. 17, Issue 8, pp. 1051-1057.

Vecellio, Gary, et al., "Container Services for High Confidence Software," Seventh International Workshop on Component-Oriented Programming, Jun. 10-14, 2002.

Hess, Christopher, et al., "An Adaptive Data Object Service for Pervasive Computing Environments," Dec. 4, 2000, pp. 1-27.

International Search Report for PCT/US05/14430 dated Jul. 27, 2005.

Written Opinion for PCT/US05/14430 dated Jul. 27, 2005.

"Microsoft Computer Dictionary," Fifth Edition, Microsoft Press, 2002; pp. 115, 176, 542.

Menci et al., "Enhancing EJB Component Model," Academy of Sciences for the Czech Republic, 2001, 11 pages.

Popovici et al., "Spontaneous Container Services," ECOOP 2003, LNCS 2743, 2003, pp. 29-54.

Sun Microsystems Enterprise Java Beans™ Specification, Version 2.1, Final Release, Nov. 12, 2003.

* cited by examiner

SYSTEM AND METHOD FOR WEB APPLICATION EXTENSIBILITY

CLAIM OF PRIORITY

This application claims the benefit of:

U.S. Provisional Patent Application No. 60/571,106, entitled SYSTEM AND METHOD FOR WEB APPLICATION EXTENSIBILITY by Mark Griffith et al., filed on May 14, 2004.

CROSS-REFERENCE TO RELATED APPLICATIONS

The present application relates to the following applications, which are hereby incorporated by reference in their entirety:

U.S. patent application Ser. No. 10/961,261 entitled SYSTEM AND METHOD FOR UNIFIED FILE MANAGEMENT, by Rob Woollen, filed on Oct. 8, 2005;

U.S. patent application Ser. No. 10/969,089 entitled SYSTEM AND METHOD FOR APPLICATION LIBRARIES, by Rob Woollen, et al., filed on Oct. 20, 2004;

U.S. patent application Ser. No. 10/962,133 entitled SCOPED APPLICATIONS, by Rob Woollen, filed on Oct. 8, 2004;

U.S. patent application Ser. No. 10/961,304 entitled SYSTEM AND METHOD FOR CUSTOM MODULE CREATION AND DEPLOYMENT, by Rob Woollen, filed on Oct. 8, 2004; and U.S. patent application Ser. No. 60/572,645 entitled SYSTEM AND METHOD FOR APPLICATION CONTAINER ARCHITECTURE, by Rob Woollen, filed on May XX, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to systems, methods, and computer readable media for structuring and deploying web applications. More particularly it relates to systems, methods, and computer readable media for extending the functionality of web applications.

BACKGROUND OF THE INVENTION

Since its inception in 1995, the Java™ programming language has become increasingly popular. (Java™ is a trademark of Sun Microsystems, Inc.) Java, which is an interpreted language enabled the creation of applications which could be run on a wide variety of platforms. This ability to function across a variety of different client platforms, i.e., platform independence, and Java's relatively easy implementation of network applications has resulted in its use in endeavors as basic as personal web pages to endeavors as complex as large business-to-business enterprise systems.

As Java has become more commonplace, a wide variety of tools and development platforms have been created to assist developers in the creation and implementation of applications in Java as well as other languages providing platform independence. These development platforms can be built around an application server program that provides a common interface for accessing internal data and resources. These development platforms have also included commonly-used modules and components that can be included in newly-created applications, thus sparing the developers the burden of creating these components and having to recreate the efforts of others.

While these platforms enable users to utilize previously developed modules and components, there are some inefficiencies with the current mechanisms by which these modules are included in new applications. Current implementations of web application environments require that all of the resources provided by a web-application be stored within the web application. This implementation requires that whenever resources stored in a web application are updated, all web applications providing those resources must be similarly updated. What is needed is an improved method for organizing and structuring web applications.

DETAILED DESCRIPTION

Figure 1:
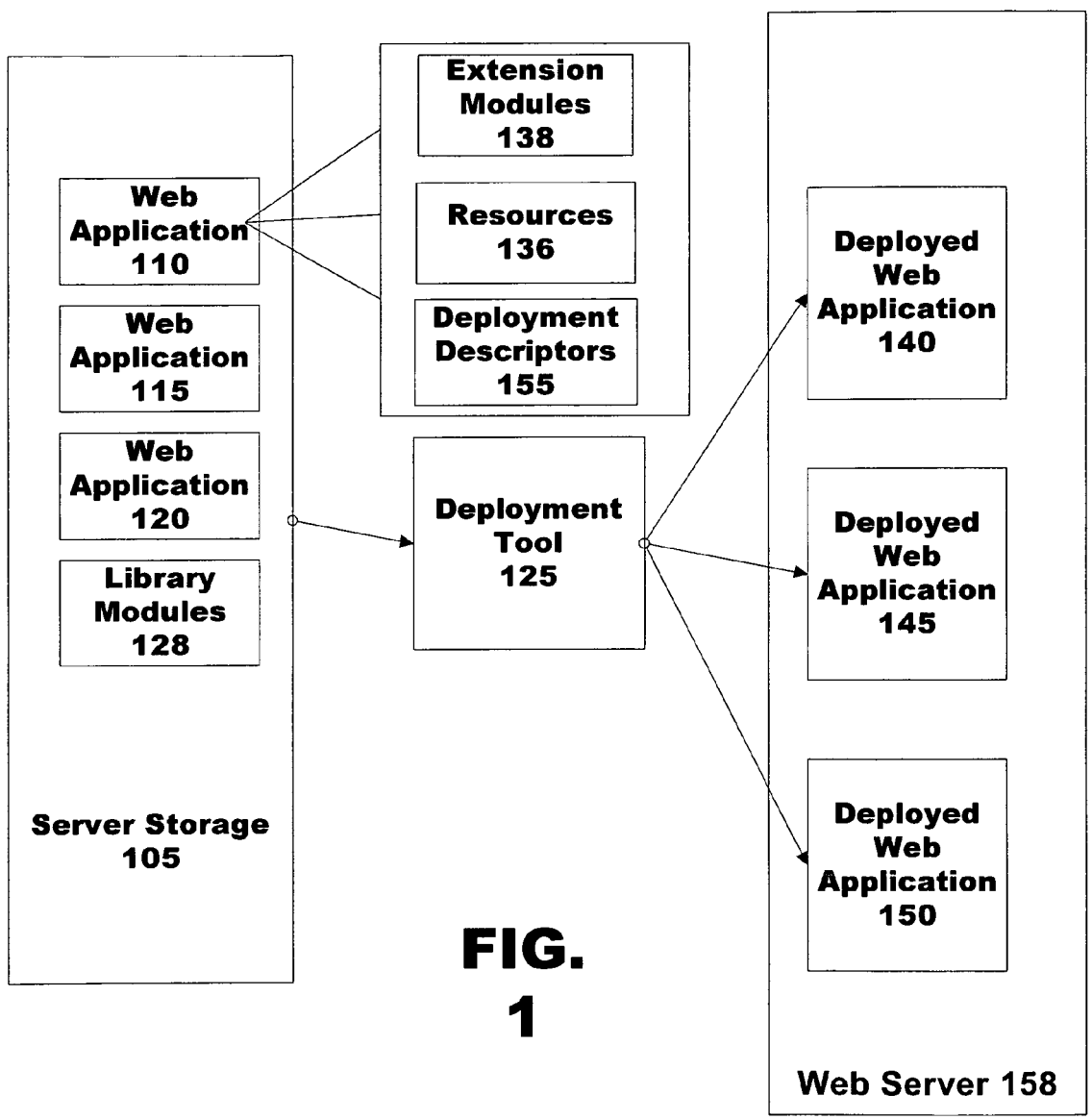
FIG. 1 illustrates a web application environment in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with one embodiment, resources provided by web applications can be extended through the implementation of library modules and extensions. Library modules stored outside a web application can provide resources in a web application environment as if they were part of the web application itself. As used herein, the term web application environment is intended to be broadly construed to include any characteristics of a computer configuration, including hardware and software characteristics, such as without limitation, operating system, Central Processor Unit (CPU) model, data communications systems, database systems, programming languages and any applicable standards, executable program code, servlets, portlets, applets, objects, classes and entities associated with an application capable of being utilized with the web. As used herein, the term application is intended to be broadly construed to include any data entry, update, query or program that processes data on behalf of a user. Additionally, web applications can be configured with application extensions that are web applications stored as archives within containing web applications. As used herein, the term interpretive language environment is intended to be broadly construed to include any characteristics of a computer configuration, including hardware and software characteristics, such as without limitation, operating system, Central Processor Unit (CPU) model, data communications systems, database systems, programming languages and any applicable standards, executable program code, servlets, portlets, applets, objects, classes and entities associated with an application capable of being utilized with an interpretive language such as without limitation Java.

The library embodiments and extensions used with web applications can provide for code and resource reuse. Embodiments can enable users to separate third party web applications or frameworks utilized by the user's web application. Embodiments can provide separate packaging of common resources as libraries that can be referenced in different web applications. These capabilities can enable users to be free of any requirements to bundle common resources together with each of the user's web application. By including a library/extension into a user's web application, a container providing an execution environment for the web application is enabled to merge the static resources, classes and jar files into the user's web application at deployment time.

FIG. 1 illustrates a web application environment in accordance with one embodiment of the present invention. The web application environment provides an interpretive language environment. The server storage 105 stores web applications 110, 115, 120. These web applications are stored in archives such as Web ARchive (WAR) files.

The server storage 105 also includes library modules 128. The library modules are commonly-used modules that are stored for deployment with created web applications. The library modules 128 are preferably stored in Web ARchive (WAR) files. In one embodiment, each WAR file stores a single library module. In an alternate embodiment, multiple library modules 128 are stored in a single WAR file. The library modules typically include a manifest identifying the library module, class files, a deployment descriptor, and additional resources. The structure of the library modules 128 is described in greater detail with respect to FIG. 3. The library modules 128 include resources that are utilized by portal applications as front end components. These resources can include Java Server Pages (JSPs), classes, servlets, links to outside resources, and static resources such as HTML pages and graphical content.

The library modules are typically registered with the server by including a reference to the library in the server's configuration parameters. In one embodiment, the configuration parameters include a config.XML file. When starting, the server detects the reference to the library and generates a configuration bean associated with the library. The reference to the library preferably includes a unique name for the library, a type for the library, a version of the library, and a location of the WAR file storing the library. One embodiment of a config.XML entry for a library file is disclosed below:

<LibraryModule
   LibraryName="BA1"
   LibraryType="war"
   ImplementationVersion="8.1"
   ImplementationURL="file:///usr/local/ba1.war"
/>

The web applications 110, 115, 120 include resources 130 which are modules that have been created for the particular web application and are either not commonly utilized or not commonly utilized enough to justify their inclusion with the library modules 125. As with the library modules, these resources can include JSPs, classes, servlets, links to outside resources, and static resources such as HTML pages and graphical content. The web applications can also include extension modules 138. The extension modules 138 are modules residing within the web application 110 that extend the functionality of the web application. The extension modules are preferably WAR files that are stored with a JAR (Java ARchive) file extension, structured with a web application file organization, and stored in a directory of the web application 110. This structure enables a developer to take a portlet and its component resources, package them into a JAR file and include them in an existing application without any need for separate registration. The extension modules may include their own deployment descriptors such as web.xml and weblogic.xml files.

The web applications also include deployment descriptors 155. In one embodiment, the deployment descriptors include a web.xml file and a weblogic.xml file. The deployment descriptors preferably include information necessary for representing the web application in different GUI tools, elements indicating each module used in the web application, its type, and its path in the WAR file storing the web application. Additionally, the web application deployment descriptors include references to the library modules 128 utilized by the web application. The reference to the library module includes the library name, which uniquely identifies the library and is compared to the library name included in either the library's manifest or the config.XML file. It also includes the implementation version, which is the minimum implementation version needed by the web application to use the library module correctly. The deployment tool 125 will compare this value with the implementation version stored in the config.XML file to verify that the two match. Finally, the entry includes a module-url which indicates a location on the server 105 where the library module can be located. Below is one example of a section of a weblogic.xml file that refers to a web application library module.

<web application>
   <display-name>ExampleWeb application</display-name>
   <description>Example</description>
<library-ref>
   <library-name>WebAppLibrary</library-name>
   <specification-version>2.0</specification-version>
   <implementation-version>8.1beta</implementation-version>
</library-ref>

The deployment tool 125 is responsible for deploying the web applications 110, 115, 120 from the server storage to generate the deployed web applications 140, 145, 150 in a web server 155. The web server 155 is a web server that acts as a web-access and application platform. One example of a web server product is WebLogic® Server by BEA systems of San Jose, Calif. Other web servers and/or other programs providing equivalent function may be used in alternative embodiments.

In one embodiment, the deployment tool runs when the server is started and automatically deploys a group of preselected web applications. In an alternate embodiment, the deployment tool allows a system administrator to manually select which web applications are deployed.

The deployment tool, when deploying a web application 110, checks the deployment descriptor 155. The deployment tool first checks for a library module reference to determine whether there are any library modules referenced by the web application 110. If so, the deployment tool uses the identifier for the library module to locate the library module on the server storage 105. The deployment tool 125 then retrieves any referenced library modules from the WAR files in which the library file is archived in the order in which the library modules are listed in the deployment descriptor. If the WAR file contains multiple library modules, all of the library modules in the WAR file are deployed. The deployment tool 125 then deploys any web application modules 136 within the web application 110, including any extension modules.

Figure 2:
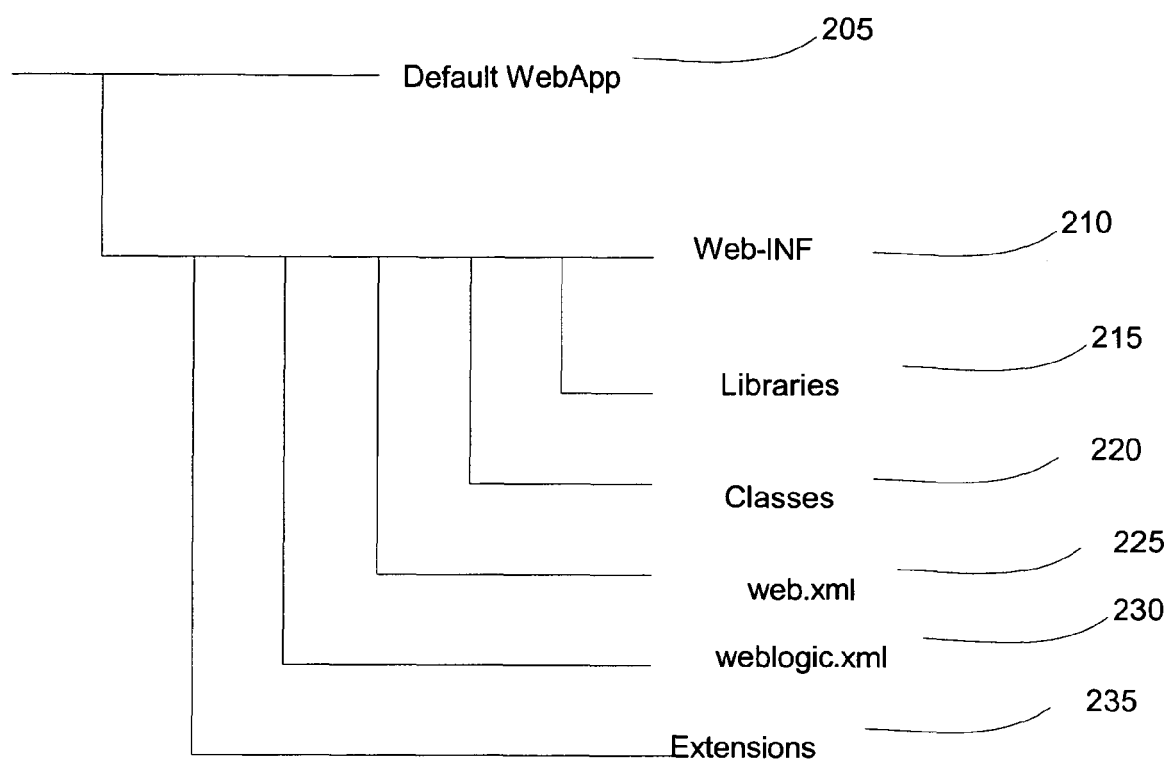
FIG. 2 illustrates a directory structure of a web application in an embodiment.

FIG. 2 illustrates a directory structure of a web application in an embodiment. The DefaultWebApp directory is a subdirectory on the server storage 105 that stores files associated with a web application 110. The DefaultWebApp includes a WEB-INF directory, which stores deployment information for the web application 110 and in its subdirectories, the resources provided by the web application 110. The WEB-INF directory 220 includes a libraries subdirectory 215. The libraries subdirectory 215 includes JAR files used by the web application 110, including tag libraries. A classes subdirectory 220 includes server-side classes such as servlets and utility classes. A web.xml deployment descriptor file includes information for deploying the web application, such as identifiers for the application, a listing of resources provided by the application, identification of library modules and identification of any extension modules 138 within the application. A weblogic.xml deployment descriptor 230 includes server-specific deployment information. In some embodiments, the extension modules 138 are referenced in the weblogic.xml deployment descriptor. An extensions subdirectory 235 includes extension modules stored as JAR files.

Figure 3:
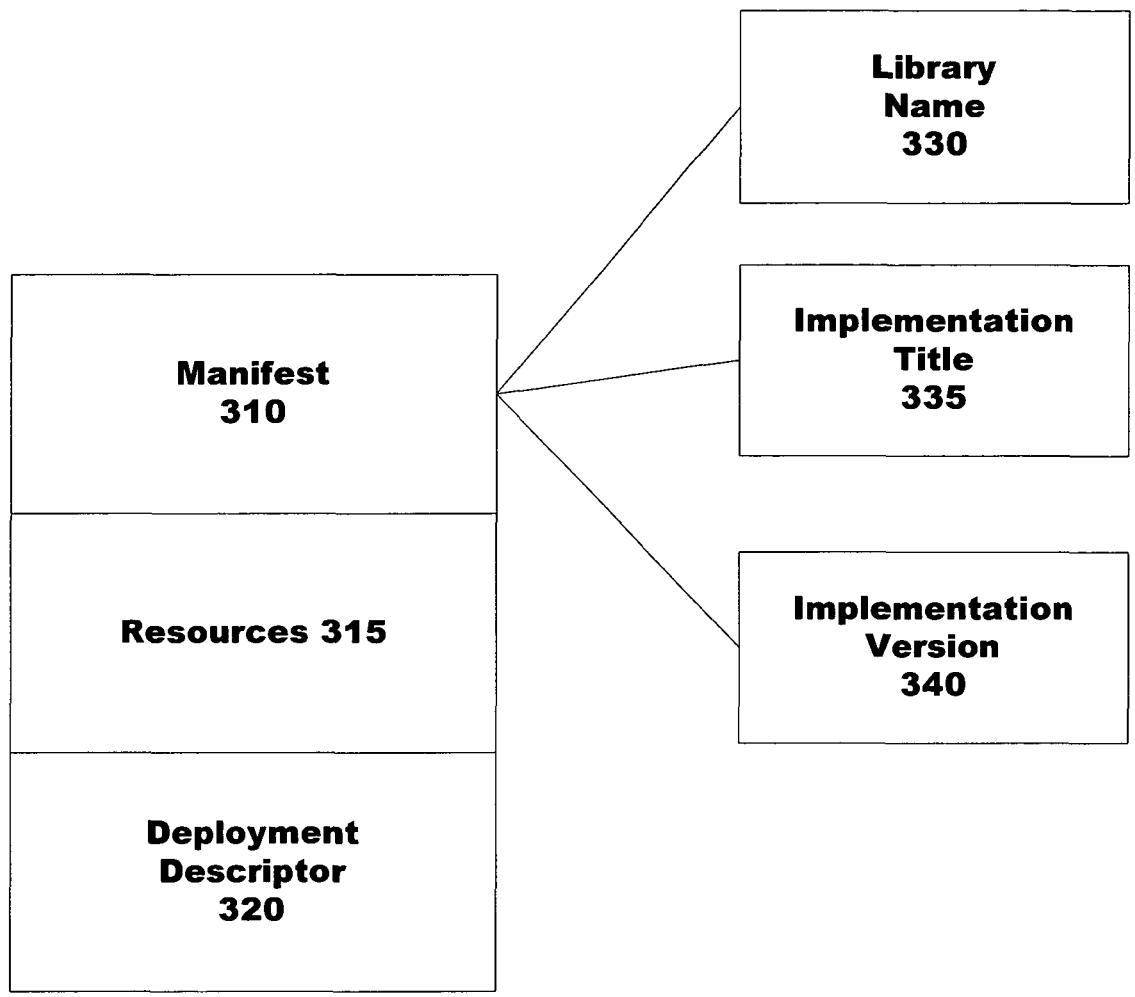
FIG. 3 illustrates the structure of a library module in an embodiment.

FIG. 3 illustrates the structure of a library module in an embodiment. The library module includes a manifest 310, resources 315, and a deployment descriptor 320. The manifest 310 stores information for uniquely identifying the module to the web server and includes the library name 330, implementation title 335, and implementation version 340. In some embodiments, the manifest 310 also includes a specification version indicating a minimum extension specification version that is needed for extensions to the library module. In these embodiments, the key that is used for identifying a library module is formatted as name/specification version/implementation version.

The library name 330 is the unique identifier used to identify the module. The library name is used by the deployment tool 125 to identify the module when referenced by the web.xml file in the web application 110. The implementation title 335 is a string that uniquely identifies the title of the library implementation. The implementation version 340 indicates a version of the implementation of the library module that is stored on the server storage. The web server preferably compares the implementation version 340 and library name 330 of the stored library module to the name and implementation version in the web.xml file of the associated web application. In one embodiment, if the library name and implementation version do not match, the deployment tool 125 will not deploy the library module.

The library module also includes resources 315. The resources 315 are resources that are made available through the deployment of the library module. The resources include JSPs, servlets, class files, tag libraries, compiled classes, static HTML pages, and any other resource that can be made available through a web application. The library module additionally includes a deployment descriptor 320. The deployment descriptor preferably includes information necessary for representing the library module in different GUI tools, elements indicating each module used in the library module, and its type and path in the WAR file storing the library module. Alternately, the library module can include a standard web application deployment descriptor.

Figure 4:
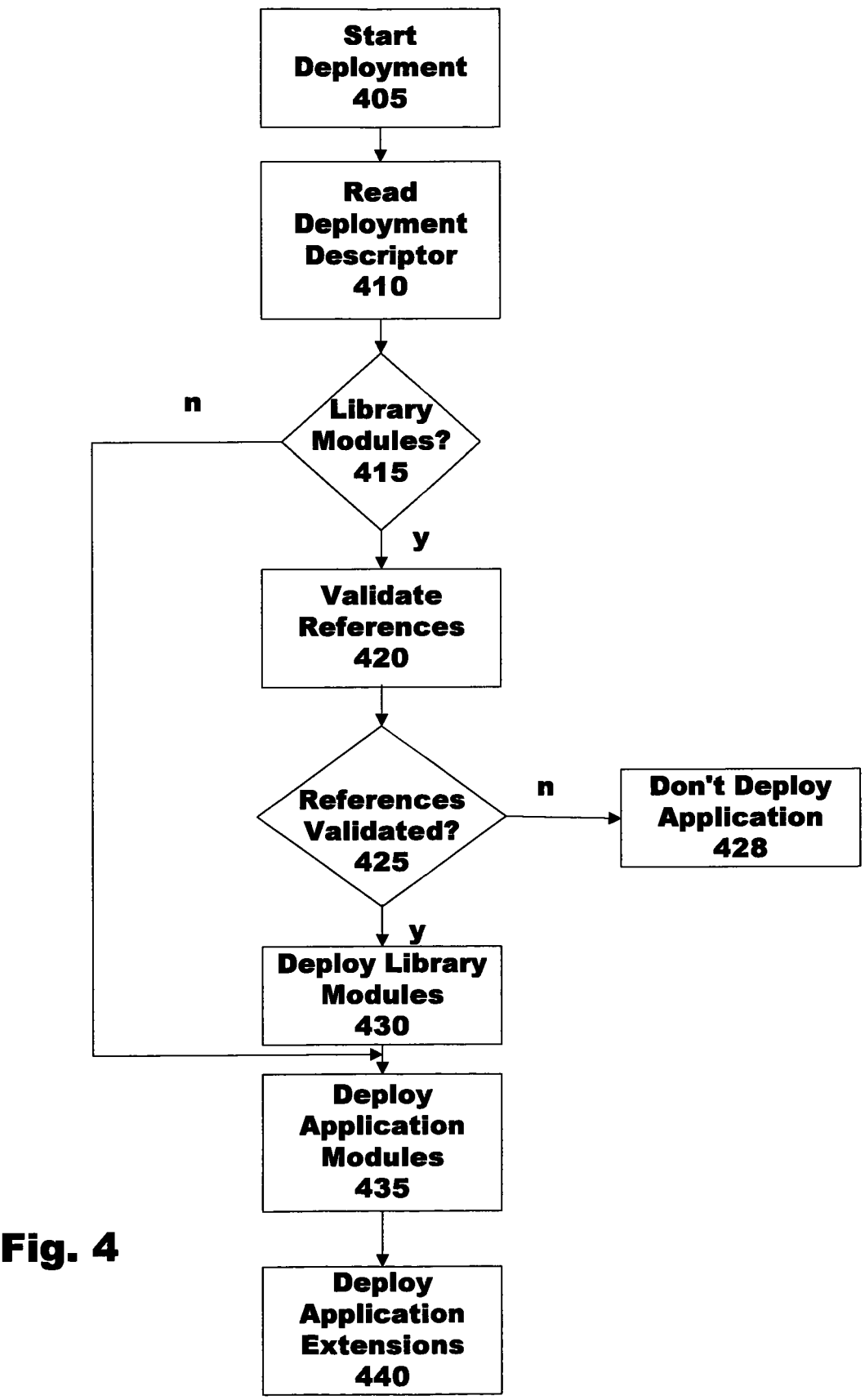
FIG. 4 is a flow chart illustrating a process for deploying a web application in an embodiment.

FIG. 4 is a flow chart illustrating a process for deploying a web application in an embodiment. The process begins with the deployment tool starting, in block (405), deployment of the web applications 110 115, 120. In one embodiment, a certain number of preselected web applications are deployed automatically. In an alternate embodiment, an administrator using a control console can manually select the web applications that he wishes to deploy. The deployment tool selects a web application for deployment and reads, in block (410), the deployment descriptor for the web application. The deployment tool determines, in block (415), whether the deployment descriptor lists any references to library modules. For those deployment descriptors that are constructed as web.xml files, this comprises checking the beginning of the web.xml file for library module references. If there are no library modules listed, the process moves to block (435), which is described below.

If there are library modules referenced in the deployment descriptor, the server then, in block (420), validates the references stored in the deployment descriptor and verifies that they are registered with the server. When the server is first booted (prior to block (405)), it performs a registration process where it reads an entry in the config.xml file indicating the location and implementation version of any library modules. Returning to block (420), the server reads the library module name listed in the deployment descriptor for the web application and loads the library module located at the location associated with the module name in the server's config.xml file. The server also checks the implementation version of the module registered with the server to make sure that it matches the implementation version listed in the referencing deployment descriptor. If no module is stored at the location listed in the config.xml file, if the module located at the location described in the config.xml file does not have the same name in its manifest as the module listed in the web.xml file, or if the implementation version listed in the config.xml file or module manifest does not match the implementation version stored in the config.xml file, the server determines, in block (425), that the library module has not been validated and halts, in block (428), deployment of the web application.

If the references are validated, the server then sequentially extracts and deploys, in block (430), each library module from the WAR file in which it is stored in the order that the library modules appear in the web.xml file. If any WAR files store multiple library modules, all of the library modules in the WAR file are deployed. When these modules are deployed, the server adds the library modules as sources for resource resolution. The process by which the library modules are utilized for resource resolution is described in greater detail with respect to FIG. 5.

The server then deploys, in block (435), the modules listed in the web application's web.xml file. In block (440), the server deploys the application extension modules. The application's resources, the resources in its extension modules, and the resources in its library modules are now accessible to portal applications.

Figure 5:
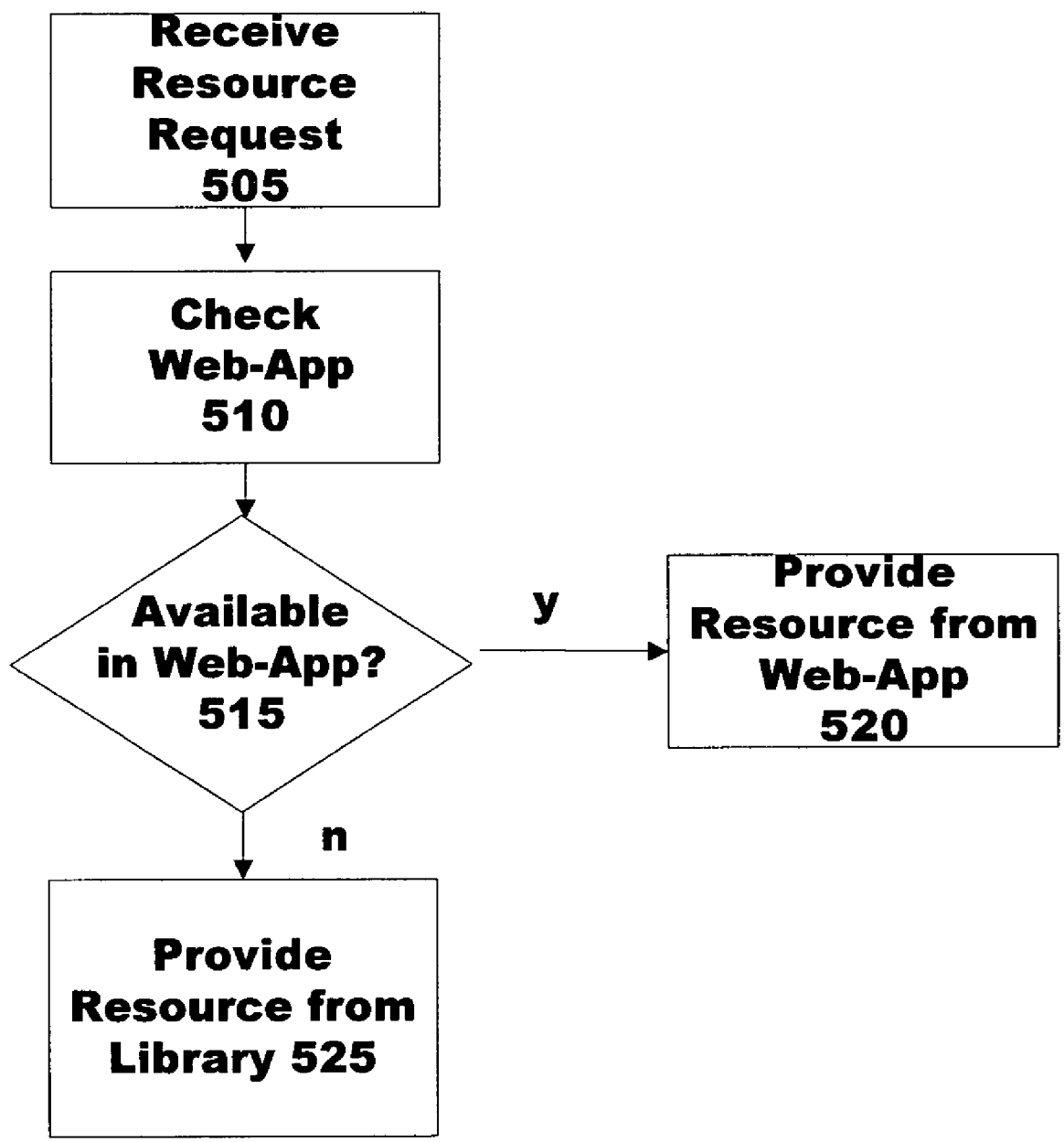
FIG. 5 illustrates a process for retrieving a resource in an embodiment.

FIG. 5 illustrates a process for retrieving a resource in accordance with one embodiment of the present invention. In block (505), the server 158 receives a resource request for resources associated with the application 110. The request resource can be static content such as an image or web page, or a classloader resource request. In block (510), the server checks the web application 110. In block (515), the server determines whether the resource is available within the web application 110. If the resource is available, in block (520) the resource is provided from the web application itself. If the resource is not stored in the web application, in block (525) the resource is provided from the library module associated with the web application.

Embodiments of libraries and extensions are almost similar in behavior and usage, some notable differences include: 1. Web Application libraries are not packaged within the user web application. But the "extensions" are packaged within the web application under WEB-ING/bea-ext. The references of the Web Application libraries go into weblogic.xml using the "library-ref" element. 2. Since the web application libraries are deployed separately (using the "library" element in config.xml), the size of the user web application which references them is small. 3. The precedence is defined as following: extensions→user-web application→web application libraries. So extensions always override the user web application resource and classes.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical web application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of web application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user web applications.

Included in the programming (software) of the general/specialized computer or microprocessor are software modules for implementing the teachings of the present invention.

What is claimed:

1. A method for deploying a web application, comprising the steps of:
   providing a server which includes a web application and a plurality of separately stored library modules, wherein each library module includes
      a manifest which specifies, for the library module, registration information uniquely identifying the library module to the server, including an implementation version, and a module locator that indicates a location on the server where the library module is located, and
      a plurality of resources which are made available to web applications through deployment of the library module;
   receiving a request to deploy the web application;
   parsing a deployment descriptor associated with the web application and determining references to one or more of the library modules in the deployment descriptor associated with the web application, and a minimum implementation version for each library module;
   verifying that the one or more library modules referenced in the deployment descriptor are registered with the server, and validating that the library module can be utilized by the web application according to the verification information stored in the manifest, by comparing the implementation version of the library module with the minimum implementation version specified by the web application in its deployment descriptor;
   deploying the library module on the server from the separate directory, by locating the library module using its module locator, and extracting the plurality of resources from the separate location and making available the resources to the web application; and
   deploying the web application to the web server including extending the web application with the resources made available by the previously deployed library modules.

2. The method of claim 1, further comprising deploying resources associated with the web application.

3. The method of claim 1, wherein the library module comprises HyperText Transport Markup Language (HTML) pages.

4. The method of claim 1, further comprising:
   receiving a request for a resource associated with the application;
   checking for the resource in the application; and
   providing the resource from the library module when the resource is not in the application.

5. The method of claim 1, further comprising:
   detecting an extension module in the web application, the extension module comprising a second web application stored as an archive within a directory of the web application; and
   deploying the extension module.

6. A non-transitory computer readable storage medium storing one or more sequences of instructions for deploying a web application, wherein said instructions, when executed by one or more processors, cause the one or more processors to execute the steps of:

providing a server which includes a web application and a plurality of separately stored library modules, wherein each library module includes a manifest which specifies, for the library module, registration information uniquely identifying the library module to the server, including an implementation version, and a module locater that indicates a location on the server where the library module is located, and a plurality of resources which are made available to web applications through deployment of the library module;

receiving a request to deploy the web application;

parsing a deployment descriptor associated with the web application and determining references to one or more of the library modules in the deployment descriptor associated with the web application, and a minimum implementation version for each library module;

verifying that the one or more library modules referenced in the deployment descriptor are registered with the server, and validating that the library module can be utilized by the web application according to the verification information stored in the manifest, by comparing the implementation version of the library module with the minimum implementation version specified by the web application in its deployment descriptor;

deploying the library module on the server from the separate directory, by locating the library module using its module locator, and extracting the plurality of resources from the separate location and making available the resources to the web application; and deploying the web application to the web server including extending the web application with the resources made available by the previously deployed library modules.

7. The non-transitory computer readable storage medium of claim 6, wherein the instructions further comprise instructions for deploying resources associated with the web application.

8. The non-transitory computer readable storage medium of claim 6, wherein the deployment descriptor is in eXtensible Markup Language (XML).

9. The non-transitory computer readable storage medium of claim 6, wherein the library module comprises Java Server Pages (JSPs).

10. The non-transitory computer readable storage medium of claim 6, wherein the library module comprises servlets.

11. The non-transitory computer readable storage medium of claim 6, wherein the library module comprises HyperText Transport Markup Language (HTML) pages.

12. The non-transitory computer readable storage medium of claim 6, wherein the instructions further comprise instructions for:

detecting an extension module in the web application, the extension module comprising a second web application stored as an archive within a directory of the web application; and deploying the extension module.

13. The non-transitory computer readable storage medium of claim 6, wherein the instructions further comprise instructions for:

receiving a request for a resource associated with the application; checking for the resource in the application; and providing the resource from the library module when the resource is not in the application.

14. A system for deploying an application the system comprising:

a server comprising a processor coupled to a memory;

a web application, the web application stored on a computer readable storage medium, and comprising a deployment descriptor;

a plurality of separately stored library modules stored outside the web application, wherein each library module includes:

a manifest which specifies, for the library module, registration information uniquely identifying the library module to the server, including an implementation version, and a module locator that indicates a location on the server where the library module is located, and a plurality of resources which are made available to web applications through deployment of the library module; receiving a request to deploy the web application;

a deployment tool configured to:

receive a request to deploy the web application;

parse a deployment descriptor associated with the web application and determine references to one or more of the library modules in the deployment descriptor associated with the web application, and a minimum implementation version for each library module;

verify that the one or more library modules referenced in the deployment descriptor are registered with the server, and validate that the library module can be utilized by the web application according to the verification information stored in the manifest, by comparing the implementation version of the library module with the minimum implementation version specified by the web application in its deployment descriptor;

deploy the library module on the server from the separate directory, by locating the library module using its module locator, and extracting the plurality of resources from the separate location and making available the those resources to the web application; and deploy the web application to the web server including extending the web application with the resources made available by the previously deployed library modules.

15. The system of claim 14, wherein the deployment tool is further configured to deploy the resources.

16. The system of claim 14, wherein the library module comprises HyperText Transport Markup Language (HTML) pages.

17. The system of claim 14, wherein the deployment tool is further configured to:

receive a request for a resource associated with the application;

check for the resource in the application; and provide the resource from the library module when the resource is not in the application.

18. The system of claim 14, wherein the deployment tool is further configured to:

detect an extension module in the web application, the extension module comprising a second web application stored as an archive within a directory of the web application; and deploy the extension module.

19. A non-transitory computer readable storage medium storing one or more sequences of instructions for deploying a web application, wherein said instructions, when executed by one or more processors, cause the one or more processors to execute the steps of:

providing a server which includes a web application, a plurality of separately stored library modules, and an extension module, wherein each library module includes
- a manifest which specifies, for the library module, registration information uniquely identifying the library module to the server, including an implementation version, and a module locator that indicates a location on the server where the library module is located, and
- a plurality of resources which are made available to web applications through deployment of the library module;

receiving a request to deploy the web application;
detecting an extension module in a directory of the web application, the extension module comprising a second web application stored as an archive;
parsing a deployment descriptor associated with the web application and determining references to one or more of the library modules in the deployment descriptor associated with the web application, and a minimum implementation version for each library module;
verifying that the one or more library modules referenced in the deployment descriptor are registered with the server, and validating that the library module can be utilized by the web application according to the verification information stored in the manifest, by comparing the implementation version of the library module with the minimum implementation version specified by the web application in its deployment descriptor;
deploying the library module on the server from the separate directory, by locating the library module using its module locator, and extracting the plurality of resources from the separate location and making available the resources to the web application; and
deploying the extension module on the server, wherein resources of the extension module override resources of the library module.

20. The non-transitory computer readable storage medium of claim 19, wherein the extension module is stored as a Java Archive (JAR).

21. The non-transitory computer readable storage medium of claim 19, wherein the deployment descriptor comprises a reference to the extension module.

22. The non-transitory computer readable storage medium of claim 19, wherein the extension module comprises Java Server Pages (JSPs).

23. The non-transitory computer readable storage medium of claim 19, wherein the extension module comprises servlets.

24. The method of claim 1 wherein the manifest further includes the library module's name, implementation title, implementation version and specification version indicating a minimum extension specification version for extensions to the library module.

25. The method of claim 24 wherein the library module name is a unique identifier used to identify the module, the implementation title is a string that uniquely identifies a title of the library implementation and the implementation version indicates a version of the implementation of the library module that is stored on the web server's storage.

26. The method of claim 1 wherein the extension module is stored in a directory of the web application thereby bypassing registering the extension module.

27. The method of claim 1 wherein a configuration bean associated with the library module is generated, said configuration bean including the manifest and plurality of resources of the library module.

* * * * *